(12) United States Patent
Nelson et al.

(10) Patent No.: US 10,442,641 B2
(45) Date of Patent: Oct. 15, 2019

(54) BIN SWEEP SYSTEM

(71) Applicants: Chris Nelson, Denton, TX (US); William A. Witt, Perham, MN (US)

(72) Inventors: Chris Nelson, Denton, TX (US); William A. Witt, Perham, MN (US)

(73) Assignee: Sioux Steel Company, Sioux Falls, SD (US)

( * ) Notice: Subject to any disclaimer, the term of this patent is extended or adjusted under 35 U.S.C. 154(b) by 159 days.

(21) Appl. No.: 14/955,713

(22) Filed: Dec. 1, 2015

(65) Prior Publication Data

US 2016/0152422 A1    Jun. 2, 2016

Related U.S. Application Data

(60) Provisional application No. 62/086,287, filed on Dec. 2, 2014, provisional application No. 62/126,921, filed on Mar. 2, 2015.

(51) Int. Cl.
*B65G 65/48* (2006.01)
*B65G 65/42* (2006.01)

(52) U.S. Cl.
CPC ....... *B65G 65/4809* (2013.01); *B65G 65/425* (2013.01); *B65G 65/4836* (2013.01)

(58) Field of Classification Search
CPC .................. B65G 65/425; B65G 65/4836
USPC ................. 198/550.12, 734, 735.6
See application file for complete search history.

(56) References Cited

U.S. PATENT DOCUMENTS

| | | |
|---|---|---|
| 822,547 A | 6/1906 | Nicolson |
| 2,646,023 A | 7/1953 | Virgil |
| 2,722,305 A * | 11/1955 | McCabe ................ B65B 25/18 198/734 |
| 2,763,362 A | 9/1956 | Greaves |
| 2,801,137 A | 7/1957 | Clay |

(Continued)

FOREIGN PATENT DOCUMENTS

| | | |
|---|---|---|
| CA | 2312068 | 12/2001 |
| FR | 1032110 | 6/1953 |

(Continued)

OTHER PUBLICATIONS

G & G Manufacturing SC-X 4 Ratchet Slip Clutches, Jun. 17, 2012, https://web.archive.org/web/20120617003451/http://www.ggmfg.com/Products/CouplersClutches/SCX4RatchetSlipClutches.aspx.
Sudenga Industries, Inc., Press Release, Nov. 1, 2004, pp. 1-3.

*Primary Examiner* — James Keenan
(74) *Attorney, Agent, or Firm* — Jeffrey A. Proehl; Woods Fuller Shultz & Smith P.C.

(57) ABSTRACT

A bin sweep system for moving particulate material in a bin may comprise an elongated sweep apparatus having a particulate sweep structure configured to move particulate material on the floor beneath the sweep apparatus toward one end of the elongated sweep apparatus. The particulate sweep structure may include a plurality of interconnected paddles movable in a succession on a path along at least a portion of a length of the sweep apparatus and an endless loop member on which the paddles of the plurality of paddles are mounted at spaced locations for moving the paddles along the path. The path of the paddles on the endless loop may generally lie in a movement plane, and an orientation of the movement plane may be tilted such that the movement plane is not in a vertical orientation and not in a horizontal orientation.

20 Claims, 13 Drawing Sheets

(56) References Cited

U.S. PATENT DOCUMENTS

| | | |
|---|---|---|
| 3,014,575 A | 12/1961 | Klein |
| 3,035,718 A | 5/1962 | Behlen |
| 3,065,996 A | 11/1962 | Patz |
| 3,067,914 A | 12/1962 | Ellaby |
| 3,175,676 A | 3/1965 | Schaff |
| 3,181,715 A | 5/1965 | Olson |
| 3,204,786 A | 9/1965 | Kucera |
| 3,228,514 A | 1/1966 | Kucera |
| 3,229,665 A | 1/1966 | Baltz |
| 3,229,827 A | 1/1966 | Kucera |
| 3,231,106 A | 1/1966 | Bruecker |
| 3,291,325 A | 12/1966 | Henningson |
| 3,297,146 A | 1/1967 | Munger |
| 3,338,636 A | 8/1967 | Chapman |
| 3,438,517 A | 4/1969 | Steffen |
| 3,451,567 A | 6/1969 | Laidig |
| 3,455,470 A | 7/1969 | Kanagy |
| 3,472,357 A | 10/1969 | Strocker |
| 3,486,643 A | 12/1969 | Smith |
| 3,647,094 A | 3/1972 | Jackson |
| 3,828,916 A | 8/1974 | Patz |
| 3,838,780 A | 10/1974 | Ridlehuber |
| 3,908,840 A | 9/1975 | Lambert |
| 3,946,861 A | 3/1976 | Sandefur |
| 3,974,908 A | 8/1976 | Keichinger |
| 3,986,600 A | 10/1976 | Pentith |
| 4,022,335 A | 5/1977 | Lambert |
| RE29,309 E | 7/1977 | Patterson |
| 4,057,151 A | 11/1977 | Weaver |
| 4,230,222 A | 10/1980 | Clark |
| 4,242,028 A | 12/1980 | Van Dusen |
| 4,313,705 A | 2/1982 | Jackson |
| 4,329,105 A | 5/1982 | Buschbom |
| 4,451,192 A | 5/1984 | Wood |
| 4,516,898 A | 5/1985 | Cantenot |
| 4,583,903 A | 4/1986 | Hutchison |
| 4,619,330 A | 10/1986 | Machnee |
| 4,619,577 A | 10/1986 | Swanson |
| 4,621,968 A | 11/1986 | Hutchison |
| 4,655,666 A | 4/1987 | Cantenot |
| 4,658,911 A | 4/1987 | Drever |
| 4,669,941 A | 6/1987 | West |
| 4,762,220 A | 8/1988 | Lutke |
| 4,773,808 A | 9/1988 | Fischer |
| 4,775,278 A | 10/1988 | Fischer |
| 4,824,312 A | 4/1989 | Schiltz |
| 4,875,820 A | 10/1989 | Lepp |
| 4,998,855 A | 3/1991 | Tschernatsch |
| 5,088,871 A | 2/1992 | Mellish |
| 5,099,983 A | 3/1992 | Valdez |
| 5,186,596 A | 2/1993 | Boucher |
| 5,203,802 A | 4/1993 | Denis |
| 5,540,533 A | 7/1996 | Eskelinen |
| 5,639,200 A | 6/1997 | Jiskoot |
| 5,769,590 A | 6/1998 | Weikel |
| 5,788,055 A | 8/1998 | Stewart |
| 5,947,261 A * | 9/1999 | Baker .................. B65G 19/14 198/734 |
| 6,017,180 A | 1/2000 | Wilham |
| 6,039,647 A | 3/2000 | Weikel |
| 6,203,261 B1 | 3/2001 | South |
| 6,254,329 B1 | 7/2001 | Sukup |
| 6,280,331 B1 | 8/2001 | Tuttlebee |
| 6,281,610 B1 | 8/2001 | Kliman |
| 6,499,930 B1 | 12/2002 | Dixon |
| 6,640,451 B1 | 11/2003 | Vinarcik |
| 6,948,902 B2 | 9/2005 | Hanig |
| 7,210,538 B2 | 5/2007 | Gust |
| 7,544,031 B2 | 6/2009 | Kaeb |
| 7,588,405 B2 | 9/2009 | Johnson |
| 7,967,542 B2 | 6/2011 | Epp |
| 8,657,025 B2 | 2/2014 | Thompson |
| 8,770,388 B1 | 7/2014 | Chaon |
| 9,120,633 B2 * | 9/2015 | Ahlen .................. B65G 65/425 |
| 9,288,946 B1 * | 3/2016 | Schuld ................ A01F 25/2018 |
| 2004/0146381 A1 | 7/2004 | Hanson |
| 2004/0213650 A1 | 10/2004 | Epp |
| 2005/0254922 A1 | 11/2005 | Berraeu |
| 2005/0263372 A1 | 12/2005 | Hollander |
| 2006/0245864 A1 | 11/2006 | Epp |
| 2006/0285942 A1 | 12/2006 | Fridgen |
| 2010/0239399 A1 | 9/2010 | Hoogestraat |
| 2013/0064629 A1 | 3/2013 | Schuelke |
| 2013/0216341 A1 | 8/2013 | Luster |

FOREIGN PATENT DOCUMENTS

| | | |
|---|---|---|
| FR | 2309442 | 11/1976 |
| FR | 2348132 | 11/1977 |
| FR | 2630620 | 11/1989 |
| GB | 1327791 | 8/1973 |
| GB | 2069448 | 8/1981 |
| GB | 2076357 | 12/1981 |

* cited by examiner

BIN SWEEP SYSTEM

REFERENCE TO RELATED APPLICATIONS

This application claims the benefit of U.S. provisional patent application No. 62/086,287, filed Dec. 2, 2014; and U.S. provisional patent application No. 62/126,921, filed Mar. 2, 2015, both of which are hereby incorporated by reference in their entireties.

BACKGROUND

Field

The present disclosure relates to bin sweeps and more particularly pertains to a new bin sweep system for moving particulate material in a storage bin in a highly effective and efficient manner.

SUMMARY

The present disclosure relates to a bin sweep system for moving particulate material in a bin may comprise an elongated sweep apparatus having a particulate sweep structure configured to move particulate material on the floor beneath the sweep apparatus toward one end of the elongated sweep apparatus. The particulate sweep structure may include a plurality of interconnected paddles movable in a succession on a path along at least a portion of a length of the sweep apparatus and an endless loop member on which the paddles of the plurality of paddles are mounted at spaced locations for moving the paddles along the path. The path of the paddles on the endless loop may generally lie in a movement plane, and an orientation of the movement plane may be tilted such that the movement plane is not in a vertical orientation and not in a horizontal orientation.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
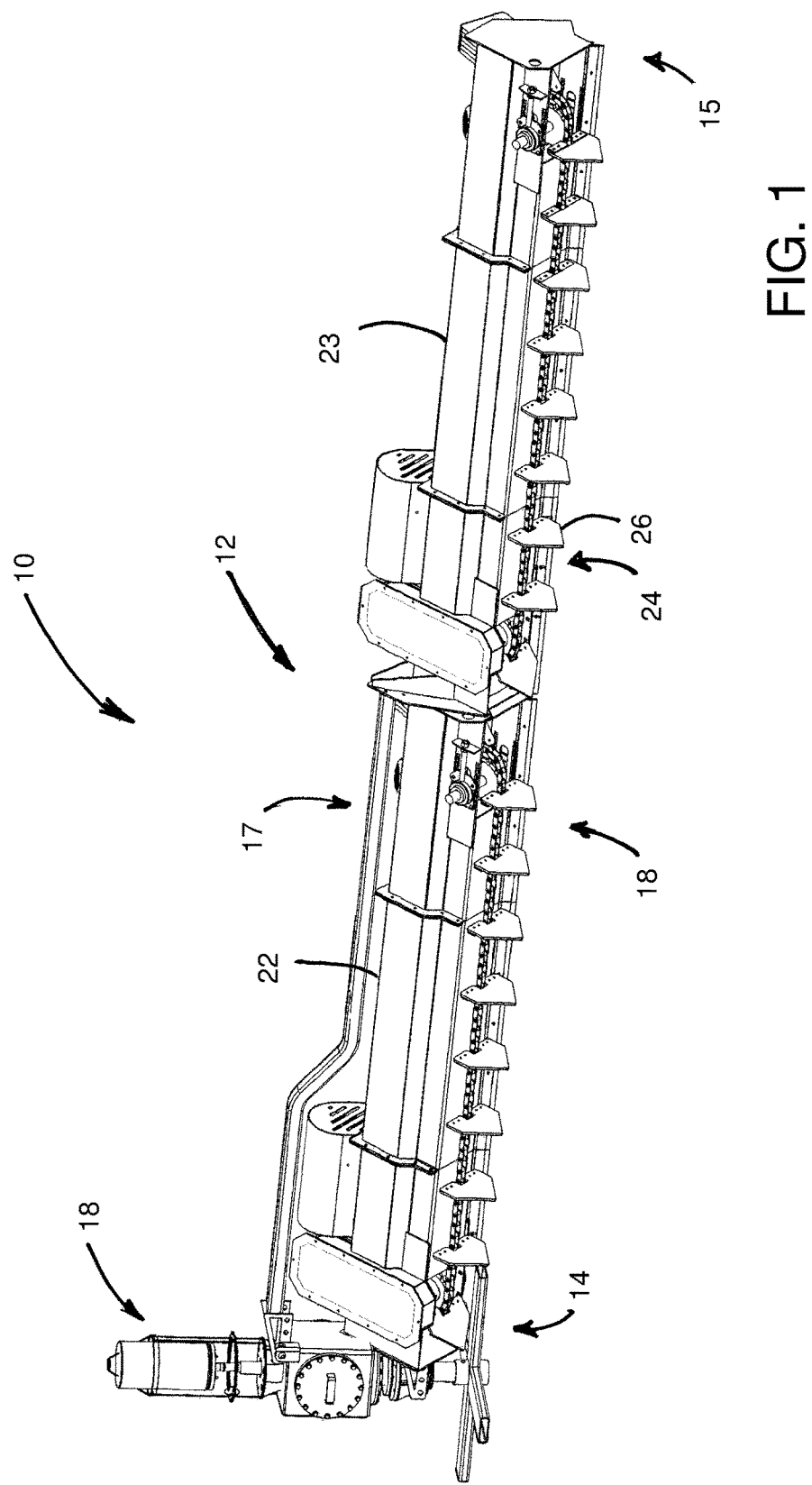
FIG. 1 is a schematic front perspective view of a new bin sweep system according to the present disclosure.
Figure 2:
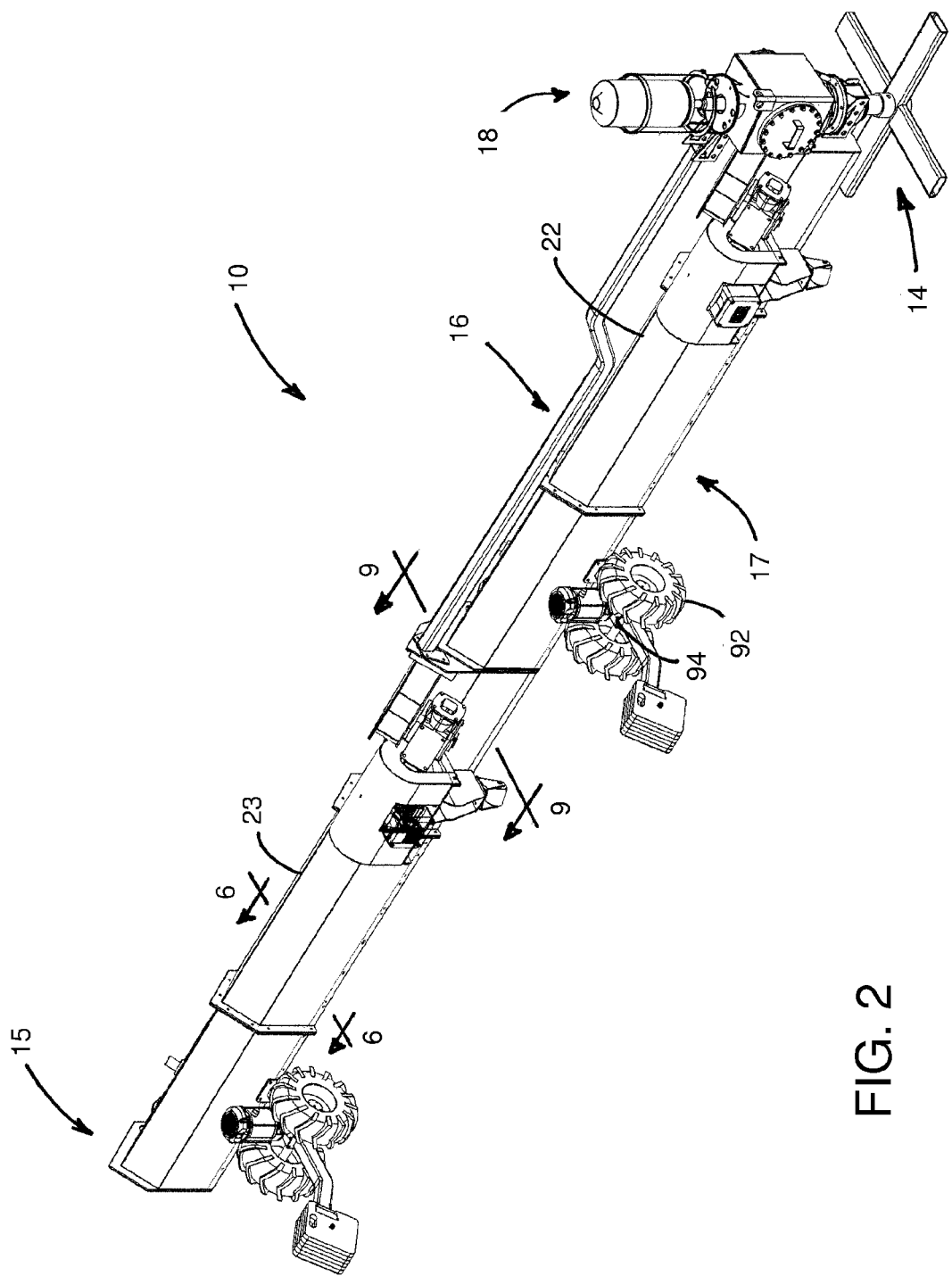
FIG. 2 is a schematic rear perspective view of the bin sweep system, according to an illustrative embodiment.
Figure 3:
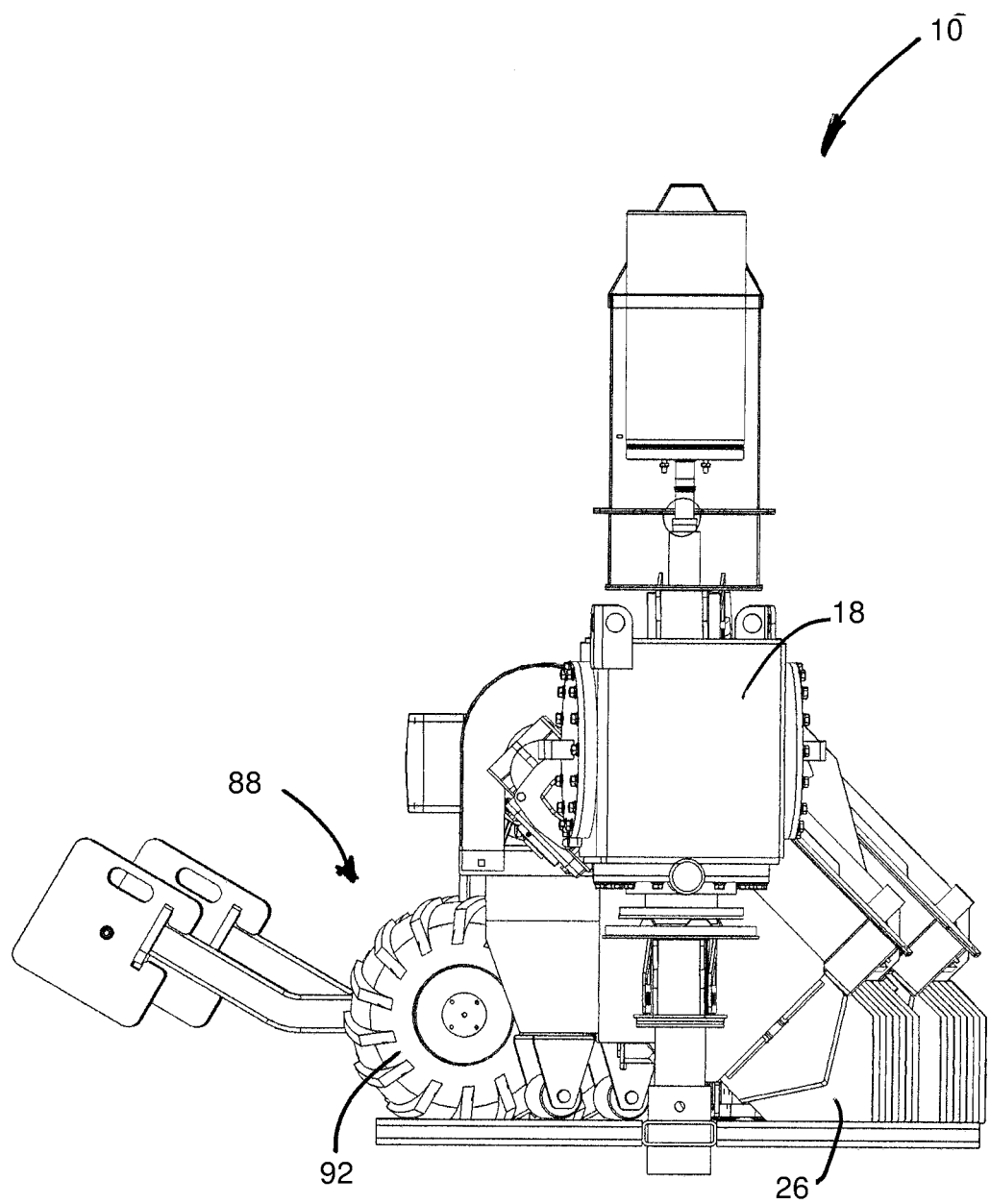
FIG. 3 is a schematic inboard end view of the bin sweep system, according to an illustrative embodiment.
Figure 4:
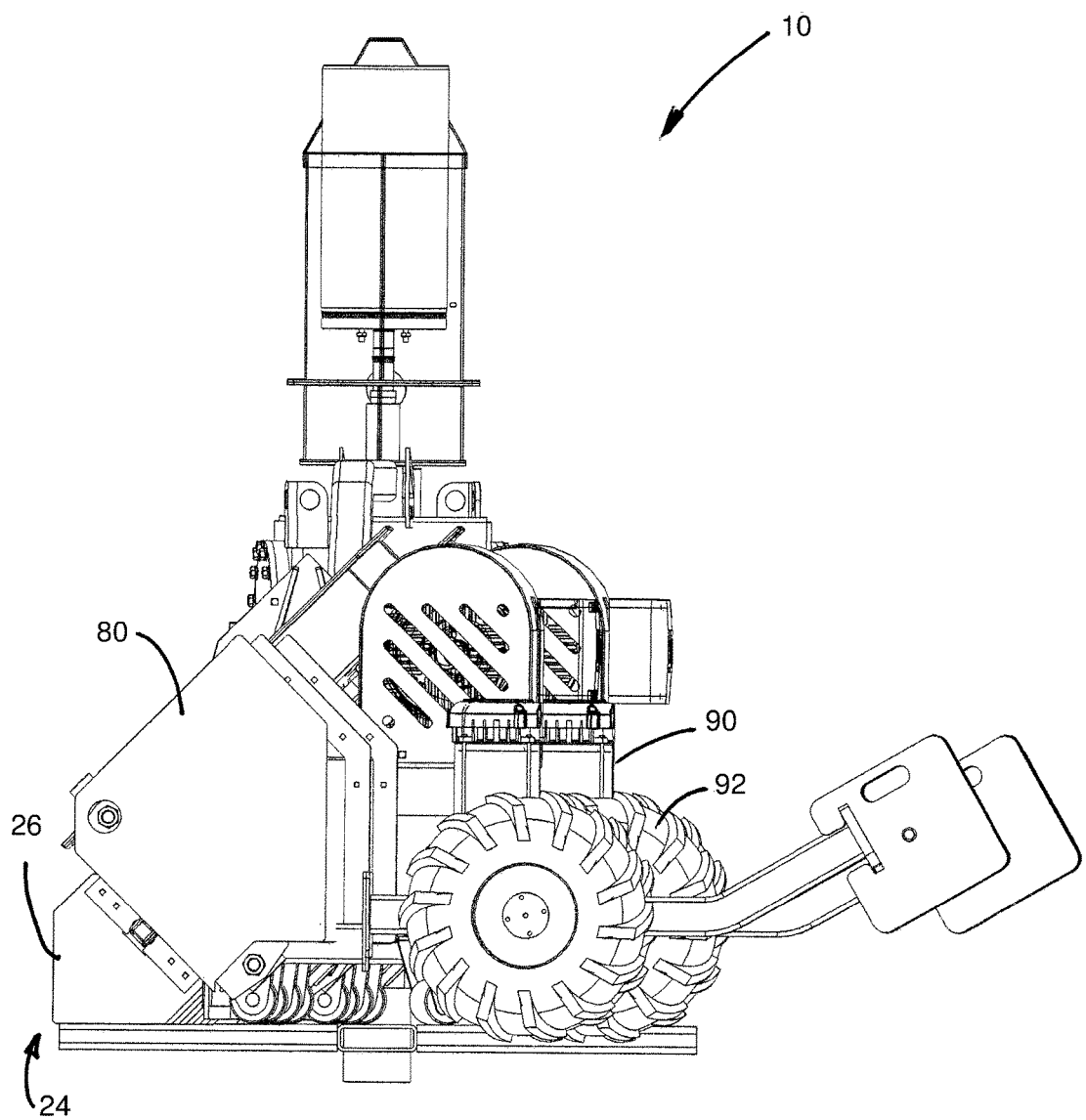
FIG. 4 is a schematic outboard end view of the bin sweep system, according to an illustrative embodiment.
Figure 5:
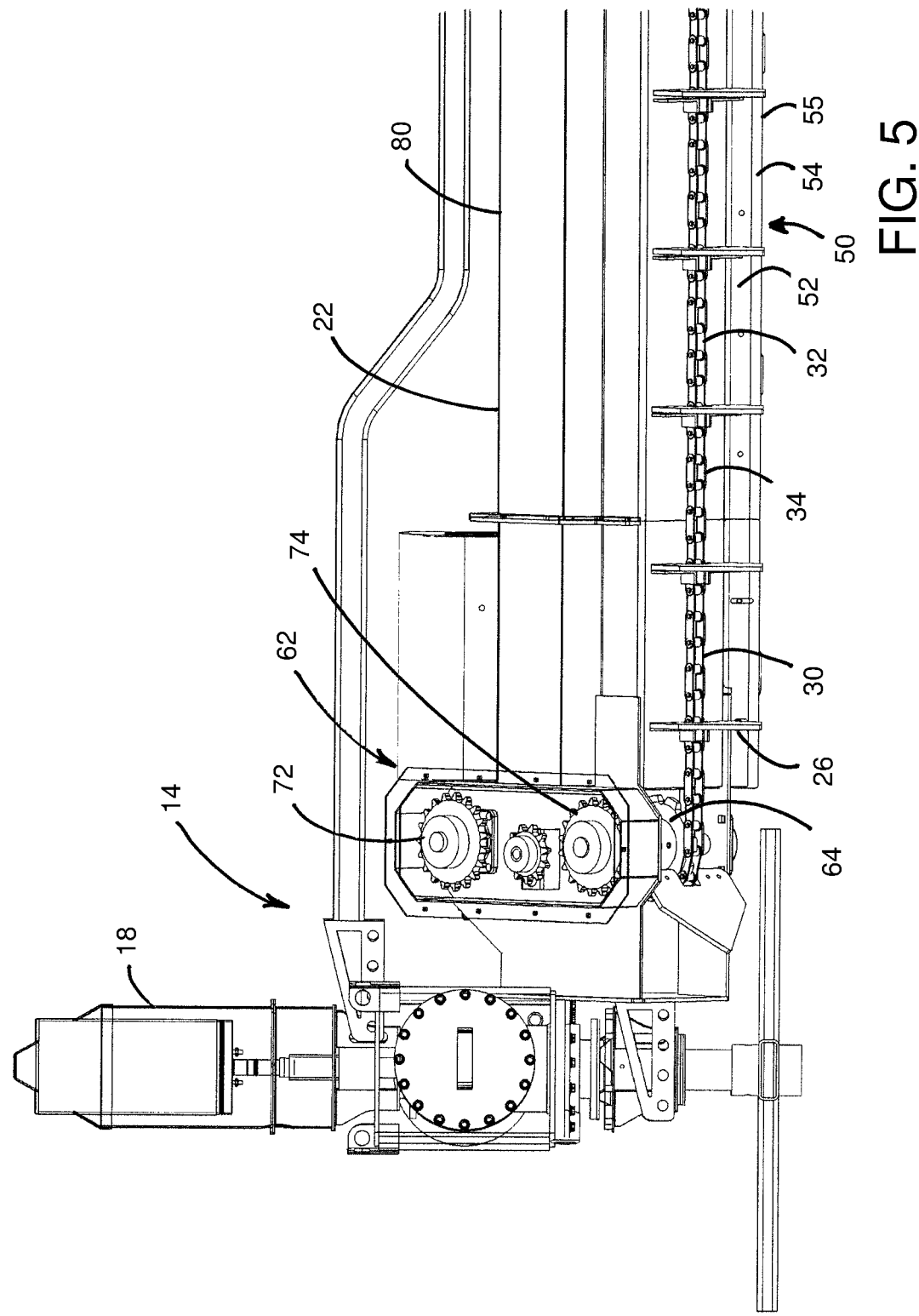
FIG. 5 is a schematic front view of an inboard end portion of the bin sweep system, according to an illustrative embodiment.
Figure 6:
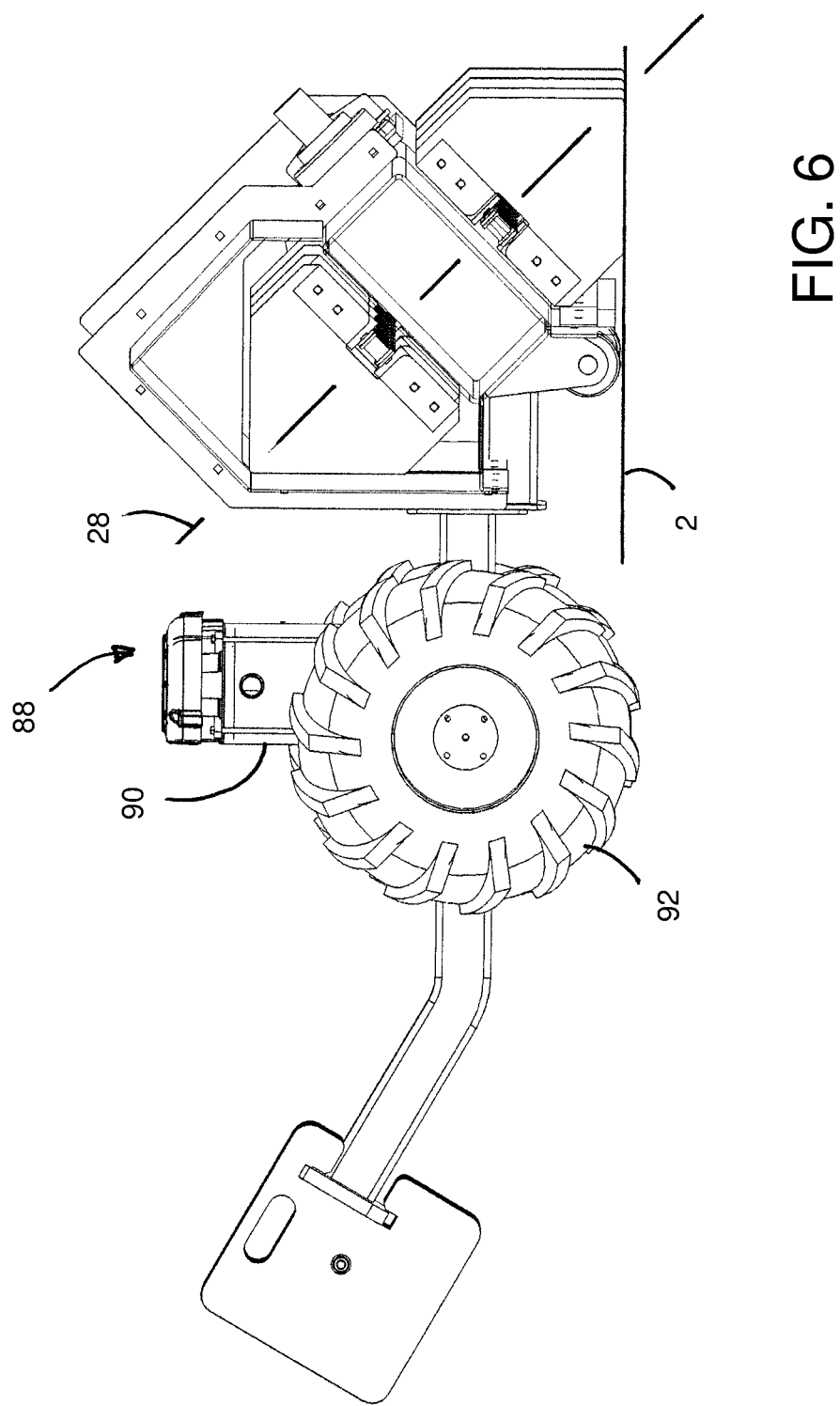
FIG. 6 is a schematic lateral cross sectional view of the bin sweep system taken along line 6-6 of FIG. 2, according to an illustrative embodiment.
Figure 7:
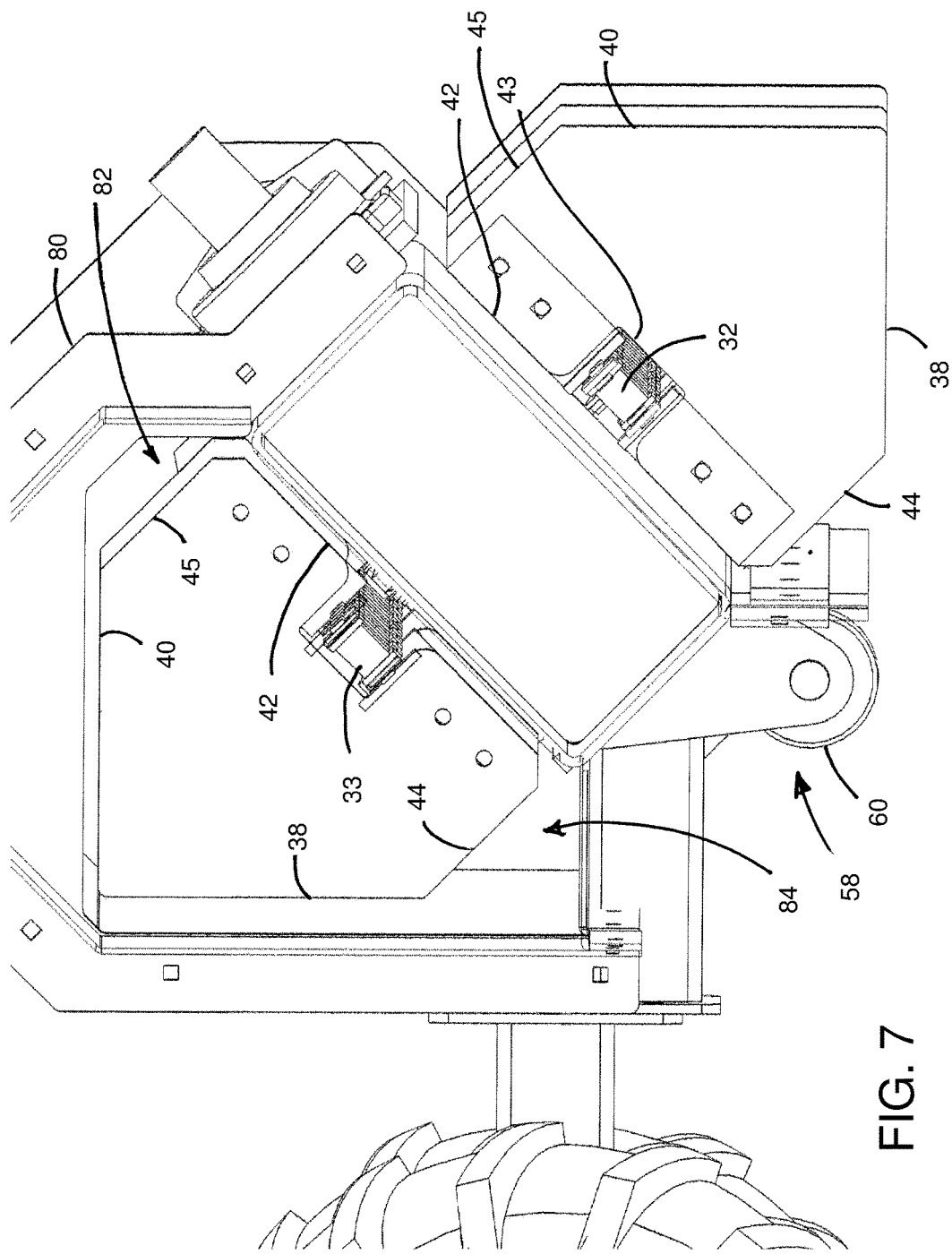
FIG. 7 is a schematic enlarged view of the lateral cross sectional view of the bin sweep system shown in FIG. 6, according to an illustrative embodiment.
Figure 8:
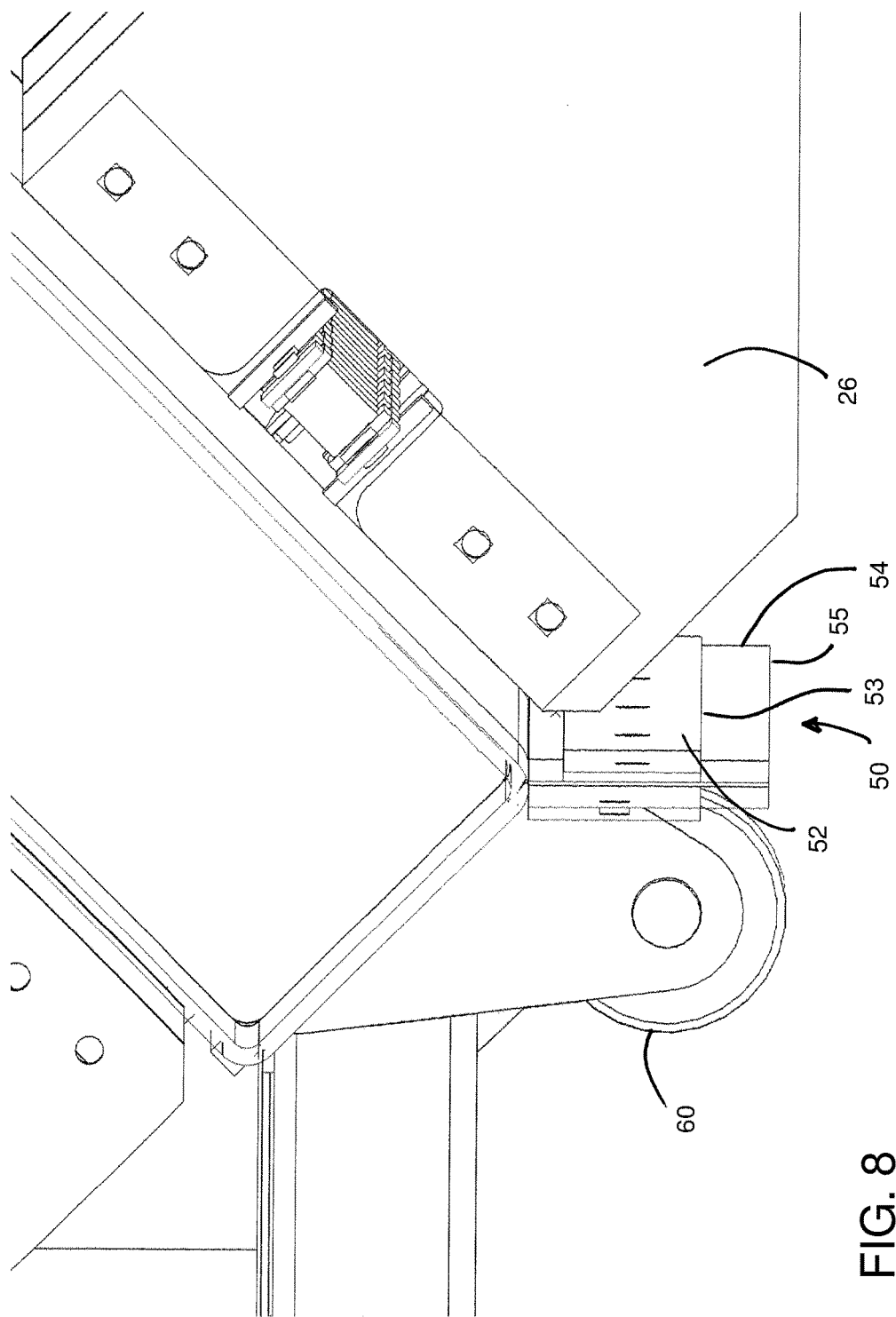
FIG. 8 is a schematic further enlarged view of the lateral cross sectional view of the bin sweep system shown in FIG. 6, according to an illustrative embodiment.
Figure 9:
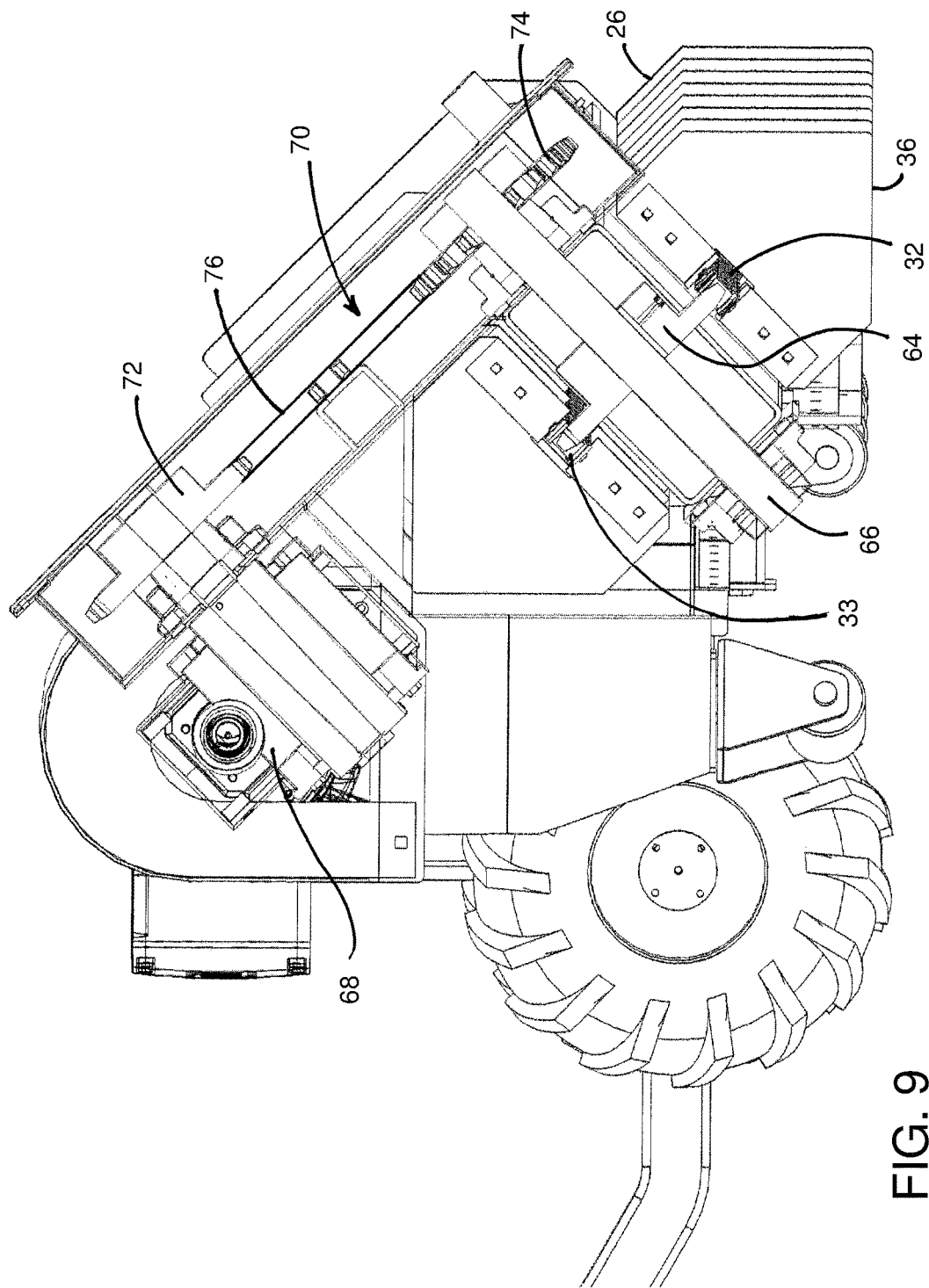
FIG. 9 is a schematic lateral cross sectional view of the bin sweep system taken along line 9-9 of FIG. 2, according to an illustrative embodiment.
Figure 10:
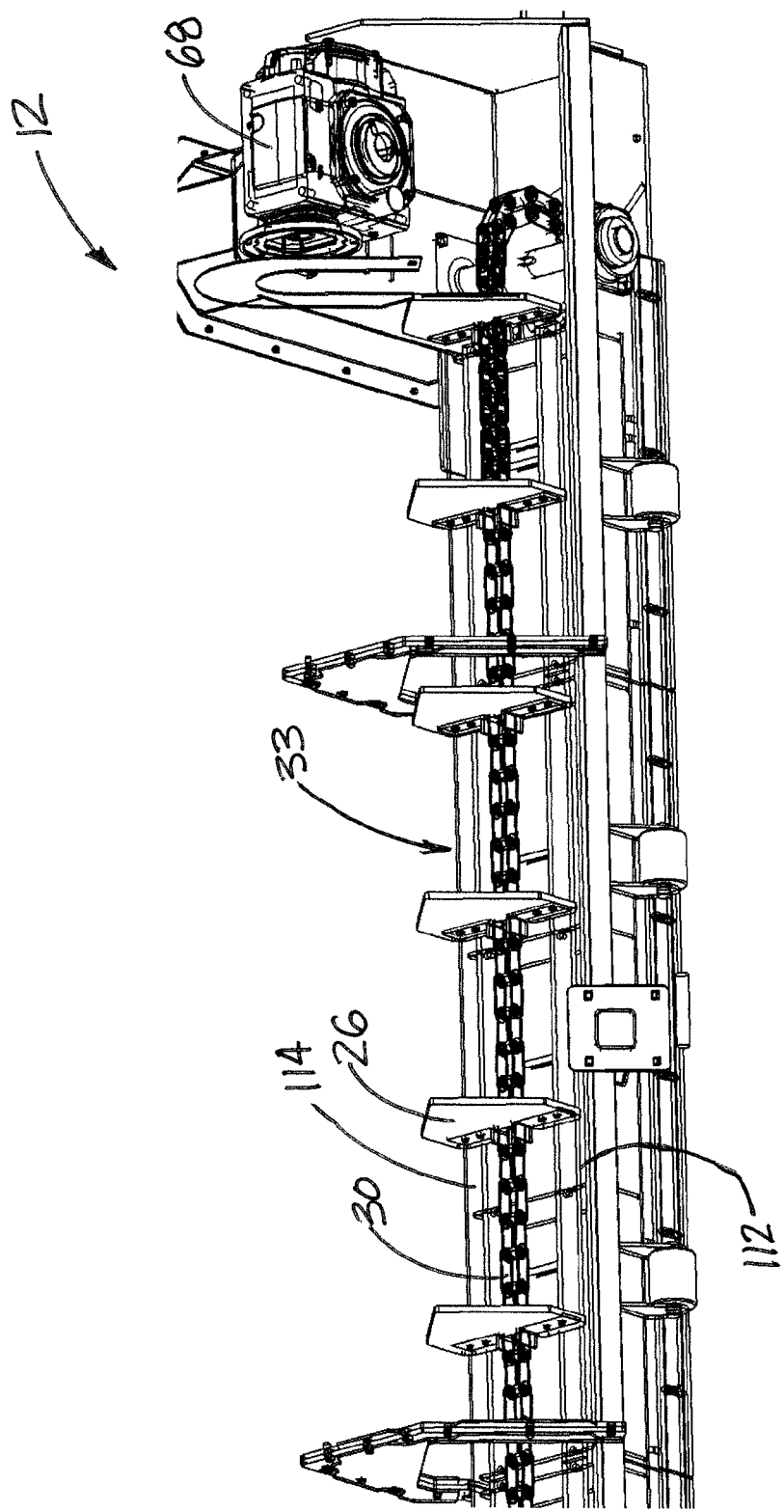
FIG. 10 is a schematic perspective view of a portion of an illustrative embodiment of the bin sweep system shown with parts removed to reveal detail of the structure.
Figure 11:
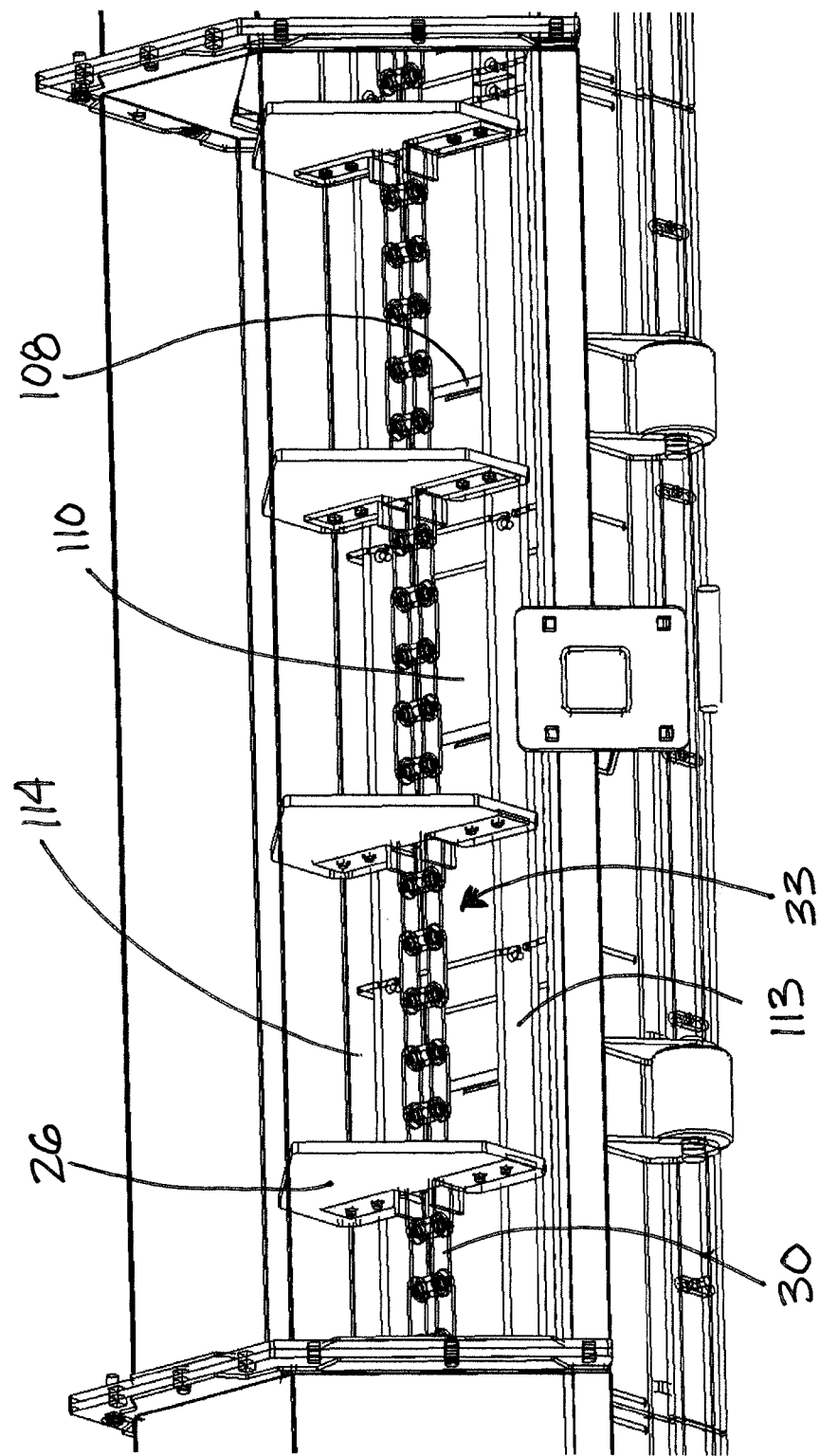
FIG. 11 is a schematic perspective view of an enlarged portion of an illustrative embodiment of the bin sweep system shown with parts removed and parts shown in phantom lines to reveal detail of the structure.
Figure 12:
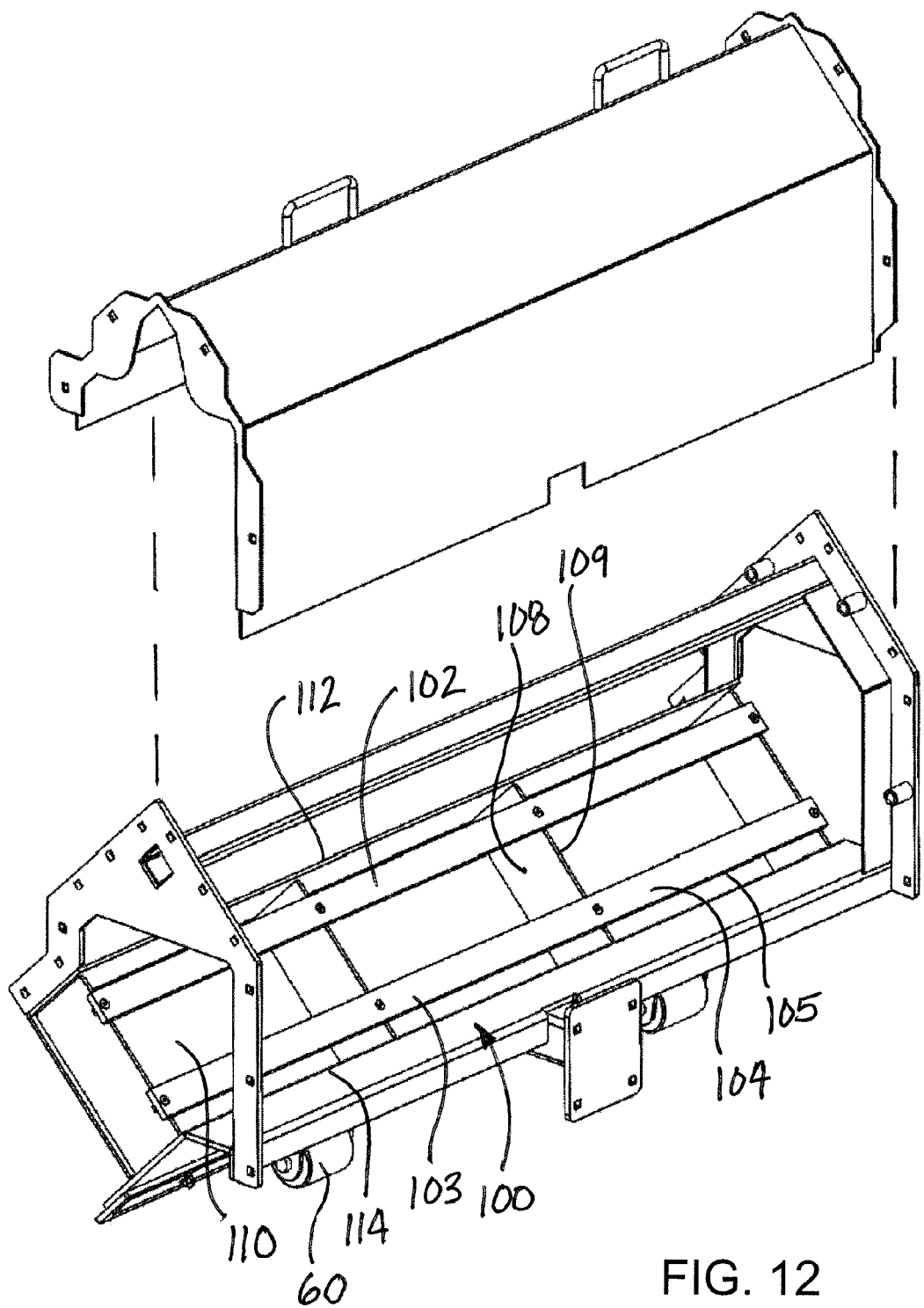
FIG. 12 is a schematic exploded perspective view of a portion of an illustrative embodiment of the bin sweep system shown with parts removed to reveal detail of the structure.
Figure 13:
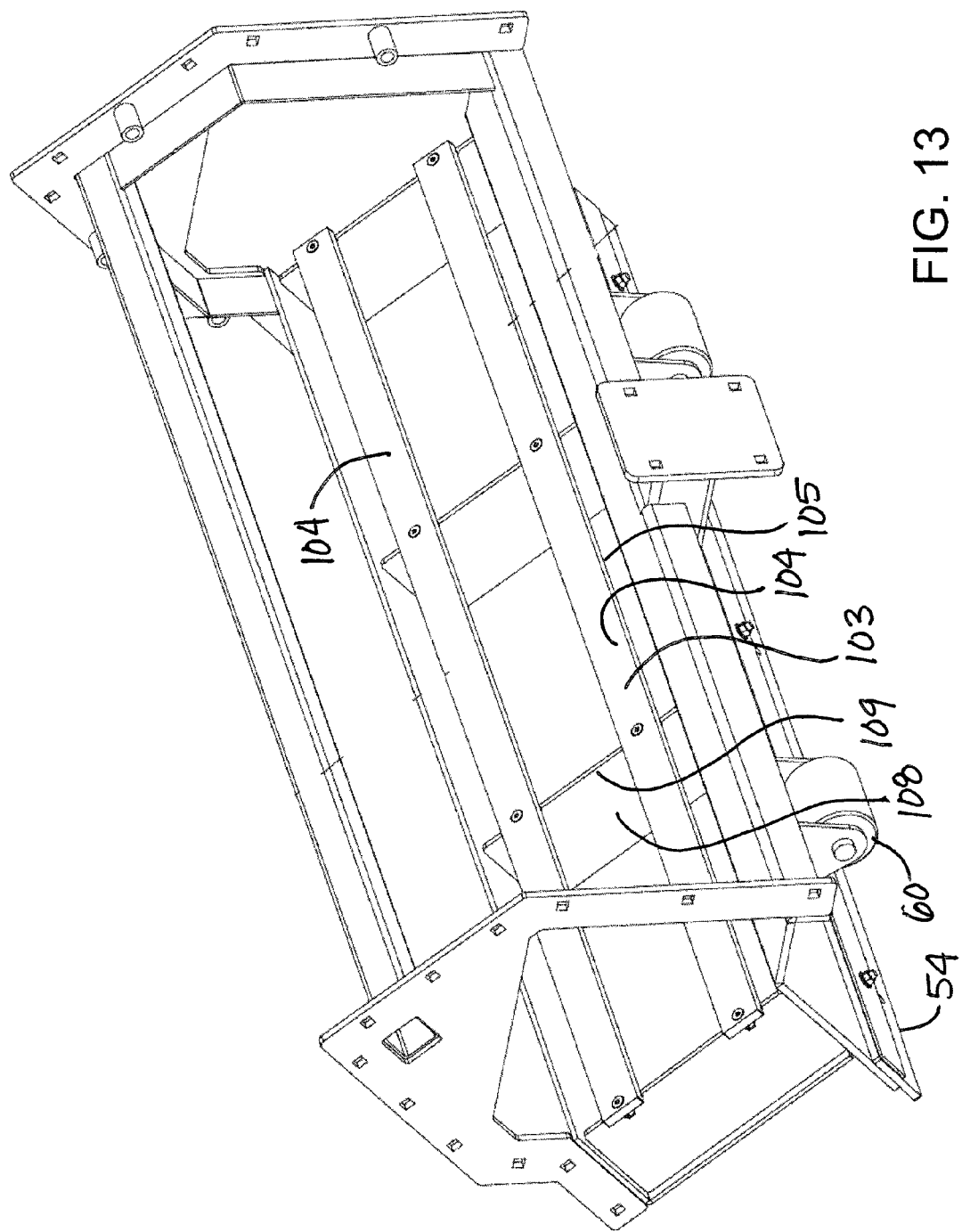
FIG. 13 is a schematic perspective view of a portion of an illustrative embodiment of the bin sweep system shown with parts removed to reveal detail of the structure.

With reference now to the drawings, and in particular to FIGS. 1 through 13 thereof, a new bin sweep system embodying the principles and concepts of the disclosed subject matter will be described.

Applicants have recognized that there are primarily two paddle sweep configurations in use, with each configuration having benefits and advantages not necessarily shared by the other. One configuration of paddle sweep utilizes a loop of paddles moving in a vertically oriented plane such that paddles mounted on one portion of the loop move over and directly above paddles mounted on another portion of the loop. Another configuration of paddle sweep employs a loop of paddles moving in a substantially horizontally oriented plane such that paddles mounted on one portion of the loop pass directly in front of paddles mounted on another portion of the loop. Applicants have realized that paddle sweeps in which the paddles move in a vertically oriented loop have the advantage of lifting the paddles completely out of contact with the bin floor at the inboard or discharge end of the paddle sweep so that the particles being moved by the paddles do not continue to move with the paddles. However, loops of paddles moving in a vertical plane cannot be supported from a point directly below the center of gravity for the loop and the weight of the paddles, which can create an eccentric weight loading for the support of the sweep apparatus that typically needs to be counterbalanced with additional weight. Conversely, sweeps utilizing a loop of paddles oriented in a horizontal plane have the disadvantage that the paddles do not change in contact with, or proximity to, the bin floor at the discharge end, and as a result the paddles tend to pull a certain portion of the particles being moved back in an outward direction away from the discharge end. A benefit of the loop of paddles moving in a horizontal plane is that vertical support for the loop of paddles may be positioned much closer to the center of gravity of the loop and the paddles.

Applicants have devised a bin sweep system with a configuration for an endless loop of sweep paddles that has the advantages of both the horizontal loop and vertical loop configurations without the aforementioned disadvantages. More specifically, applicants have developed a bin sweep system with a loop of paddles that are oriented in a tilted plane that is neither substantially horizontally oriented nor substantially vertically oriented. The tilted movement plane of the paddles moves the paddles at the inboard discharge end up and away from the bin floor surface so that the paddle "releases" the particulate material, and also provides the advantage of allowing vertical support for the endless loop of paddles to be positioned relatively close to the center of gravity of the loop and paddles.

In one aspect, the disclosure relates to a bin sweep system 10 for moving particulate material in a bin. Illustratively, the particulate material may be grain; however, the disclosure is not so limited. The system 10 is suitable for using in a bin having a bin floor 2 on which the particulate material rests, and on which the bin sweep system is generally also rested. The bin floor 2 may also have a bin sump that extends into the floor of the bin and is generally located towards a center of the bin floor, although in some applications the sump may be positioned somewhat off to the side of the center of the bin.

In greater detail, the bin sweep system 10 may comprise an elongated sweep apparatus 12 with opposite ends. The opposite ends may comprise an inboard end 14 for generally locating toward a central area of the bin and the bin sump, and an outboard end 15 for generally locating toward a peripheral area of the bin and bin floor 2. The sweep apparatus 12 may have a forward side 16 that is generally oriented towards a direction of movement of the sweep apparatus during sweep operation, and a rearward side 17 that is oriented away from the direction of movement during operation. Typically, although not critically, the length of the sweep apparatus 12 between the inboard 14 and outboard 15 ends may be sized such that the sweep apparatus substantially extends between the center of the bin and a peripheral wall of the bin.

The sweep apparatus 12 may include a center post 18 that is generally positioned at the center of the bin floor, and generally adjacent to (and in some cases over) the bin sump. The sweep apparatus 12 may also include a sweep assembly 20 that is movable over the floor of the bin toward and against an accumulation or pile of particulate material generally positioned in front of the apparatus 12. While some embodiments of the sweep assembly may include a single segment, other embodiments of the sweep assembly may optionally include at least two sweep segments 22, 23 which may be positionable in a substantially linear array between the inboard 14 and outboard 15 ends of the sweep apparatus, and also may be substantially independently movable with respect to each other. The inboard end of the linear array of sweep segments may be positioned adjacent to the center post 18 and is typically connected to the center post such that the center post provides a tether for the movement of the sweep assembly across the bin floor. In some embodiments of the sweep assembly, each sweep segment may comprise two or more units that are connected together to form the sweep segment such that multiple units may be connected together to achieve a suitable length for the apparatus to span from the center of the bin to the periphery of the bin. Additional detail regarding a segmented sweep apparatus is disclosed in our U.S. patent application Ser. No. 14/868,531 filed on Sep. 29, 2015, which is hereby incorporated by reference in its entirety.

The sweep assembly 20 may include a particulate sweep structure 24 that is configured to move particulate material resting on the bin floor beneath the sweep apparatus toward the inboard end of the elongated sweep apparatus. The particulate sweep structure 24 may tend to move the particulate material toward the inboard end in a sweeping manner, although this is not critical. In some embodiments, the particulate sweep structure 24 may comprise a plurality of interconnected paddles 26 that are movable in a succession on a path along at least a portion of the longitudinal length of the sweep assembly between the inboard and outboard ends. The path of the paddles 26 generally lies in a movement plane 28. The paddles 26 may be interconnected to each other by an endless loop member 30 on which the paddles are each mounted. The paddles may be mounted at spaced locations along the length of the endless loop member, and the loop member 30 may extend along the path in order to move the paddles along the path. The endless loop member may be positioned in a loop plane and the endless loop member may rotate in the loop plane. The loop plane is preferably oriented parallel to the movement plane 28. The endless loop member 30 may include an incoming stretch 32 that generally moves in the loop plane from the outboard end toward the inboard end, and the loop member may also include an outgoing stretch 33 that generally moves in the loop plane from the inboard end to toward the outboard end. The endless loop member 30 may comprise a series of interconnected links 34, and in some of the most preferred embodiments, the endless loop member comprises a plurality of chain links forming a chain, although other forms of endless loop member may be utilized.

In those embodiments of the sweep assemblies 20 that include two or more segments, each of the sweep segments may include a proximal end 25 and distal end 27, and in at least some implementations, the proximal end of a radially outer segment is located adjacent to distal end of an inner segment. In such sweep assemblies, each sweep segment may utilize separate pluralities of interconnected paddles, and an endless loop member 30 may be provided for each segment and each segment may include its own incoming stretch and outgoing stretch, although the respective stretches of loop member of the various segments will generally travel in the same direction as each other. The paddles of the outer segment may transfer or feed particulate material to the paddles of the inner segment.

Significantly, the movement plane of the path of the interconnected paddles 26 may be inclined or tilted or canted from a vertical orientation, such that the movement plane is not vertically oriented and is not horizontally oriented. The plane of the path may thus be slanted or oblique with respect to vertical and horizontal planes. In some embodiments, the movement plane may be tilted with respect to a vertical plane in a range of angles from approximately 30 degrees to approximately 60 degrees. In some of the most preferred embodiments, the movement plane may be oriented at an angle falling in a range of approximately 40 degrees to approximately 50 degrees from a vertical plane, and in some of the most preferred embodiments, the movement plane is oriented at an angle of approximately 45 degrees with respect to the vertical plane (and also approximately 45 degrees from the horizontal plane). Advantageously, the tilting of the movement plane permits the endless loop member 30 to lift the paddles 26 on the incoming stretch away from the bin floor and out of any contact with the bin floor to move along the outgoing stretch of the loop member. The paddles transitioning from the incoming stretch to the outgoing stretch are lifted away from the bin floor which eliminates any contact that the paddle had with the bin floor while moving along the incoming stretch. The movement plane is preferably tilted from a vertical plane in a rearward direction such that the movement plane extends from a forward and lower position to a rearward and upward position as it extends along the longitudinal axis of the sweep apparatus. The endless loop may thus move the paddles upwardly and rearwardly when moving from the incoming stretch of the member 30 to the outgoing stretch, and conversely may move the paddles downwardly and forwardly when the paddles on the loop member 30 move from the outgoing stretch to the incoming stretch. Generally the paddles 26 positioned on the incoming stretch 32 are positioned in an upright orientation and paddles moving along the outgoing stretch are positioned in an inverted orientation.

Each of the paddles may have a perimeter edge 36, and in some embodiments the perimeter edge may have a substantially chevron shape. The perimeter edge 36 may include a plurality of substantially linear edge portions, including a bottom edge portion 38 for positioning adjacent to the bin floor when the paddle is generally moving along the incoming stretch 32. When the paddle is moving along the incoming stretch, and positioned in the upright orientation, the bottom edge portion may be oriented substantially horizontal, but may be oriented substantially vertically when the paddle is in the inverted orientation and moving along the outgoing stretch. The bottom edge may be substantially linear in shape for the best engagement with grain particles and optionally the bin floor, although other configurations may be utilized. The perimeter edge 36 may also include a front edge portion 40 for generally positioning toward the front of the sweep assembly when the paddle is positioned in the upright orientation and moving along the incoming stretch. The front edge may be oriented substantially horizontally when the paddle is in the inverted orientation and moving along the outgoing stretch. Illustratively, the front edge portion may be oriented substantially perpendicular to the bottom edge portion, although this is not critical. The perimeter edge 36 may also include a back edge portion 42 for positioning toward the rear of the sweep assembly when the paddle is positioned in the upright orientation and moving in the incoming direction. The back edge portion may be oriented at an angle to the vertical when the paddle is in the upright orientation, and a line of the back edge portion may be positioned substantially perpendicular to the movement plane. The back edge portion may also include a notch 43 for receiving a portion of the endless loop member 30. The perimeter edge 36 may also include a pair of side edge portions 44, 45 which are positioned either between the rear edge portion and the bottom edge portion or the rear edge portion and the front edge portion. Each of the side edge portions may be oriented at a tilt or incline that is substantially perpendicular to the back side edge, and thus may be generally parallel to the orientation of the movement plane.

The sweep assembly 20 may also include a wiper structure 50 that is configured to resist or block particles from passing underneath the sweep assembly to move to the rear of the sweep assembly as the assembly moves forward. The wiper structure 50 may be configured to push particles ahead of the wiper structure as the sweep assembly moves forwardly, and the wiper structure may extend generally downwardly from the housing of the sweep assembly toward the bin floor, and in some embodiments may contact the bin floor. The wiper structure may extend generally longitudinally with respect to the sweep assembly, and may extend from a proximal end of the sweep assembly segment to a distal end of the segment. The wiper structure may be positioned rearwardly of the paddles mounted on the incoming stretch of the endless loop member and may also be positioned below the paddles mounted on the outgoing stretch of the endless loop member.

In some embodiments, the wiper structure 50 comprises a channel member 52 which is positioned toward the bottom of the housing, and the channel member may define a channel 53 that opens generally downwardly. The channel member and the channel formed thereby may extend generally longitudinally of the sweep assembly or the respective sweep assembly segment. The wiper structure may also include at least one wiper 54 that is at least partially positioned in the channel of the channel member and may extend downwardly toward the bin floor below the sweep assembly. At least one wiper 54 may have a lower edge 55 for contacting the bin floor or for positioning closely adjacent to the surface of the bin floor. In some embodiments, multiple wipers may be utilized in the channel member, although a single wiper may be employed. The wiper structure may also include a biasing element that is configured to bias the wiper in a downward direction toward the bin floor and optionally into contact with the bin floor. The biasing element may comprise a spring that is positioned in the channel of the channel member and presses downwardly against an upper edge of the wiper, and any suitable spring may be utilized, such as a coil spring or a leaf spring.

The sweep assembly may also include a support structure 58 that is configured to provide support to the sweep assembly. In some embodiments, the support structure is positioned rearwardly of the wiper structure, and may be positioned below the paddles that are mounted on the outgoing stretch of the endless loop member. The support structure may comprise a plurality of wheels 60, and the wheels may be positioned generally below the housing. In some embodiments, the wheels may comprise caster wheels that are swivelable about a substantially vertical axis, as well as being rotatable about a horizontal axis, although this is not critical. Significantly, the position of the support wheels may be located below the position of the loop and between the stretches of loop and connected paddles so that the sweep assembly is supported relatively closely to the center of gravity or mass of the sweep assembly by the wheels.

A paddle movement assembly 62 may be provided to move the plurality of interconnected paddles along the path and generally cause the endless loop member to move between the incoming and outgoing stretches. In some embodiments, the paddle movement assembly 62 may be located in a power unit when the sweep assembly segment is comprised of a plurality of units. The power unit may be positioned toward the inboard end of the sweep apparatus, as well as the proximal end of a sweep assembly segment, although this is not critical. The paddle movement assembly may illustratively comprise a rotatable drive member 64 on which a portion of the endless loop member is entrained, and the rotatable drive member may engage a portion of the endless loop member at a transition between the incoming and outgoing stretches. The rotatable drive member may be positioned toward the proximal end of the sweep assembly segment, and thus may guide the transition of the endless loop member between the incoming and outgoing stretches. In embodiments of the apparatus in which the loop member 30 comprises a chain, the drive member 64 may comprise a sprocket. The paddle movement assembly may also include a rotatable transfer shaft 66 on which the drive member 64 is mounted. The paddle movement assembly may further comprise a motor 68 for rotating the endless loop member, and the motor may have a rotatable drive shaft extending from the motor and being rotated by operation of the motor. The paddle movement assembly may have a drive linkage 70 that is configured to connect the motor to the endless loop member. More specifically, the drive linkage may comprise a driver sprocket 72 that is mounted on the motor shaft, a driven sprocket 74 that is mounted on the rotatable transfer shaft 66, and a chain loop 76 that links the driver and driven sprockets to transfer rotation therebetween.

The sweep assembly may also include a housing 80 that generally extends between the opposite ends of the sweep assembly, and defines an interior 82. At least a portion of the particulate sweep structure may be positioned in the interior of the housing, and the interior may have an upper space 84 in which the outgoing stretch of the endless loop member may be positioned. The incoming stretch of the endless loop member and paddles mounted thereon may be located below the housing or in a lower space of the housing that is generally located below the upper space, although in some embodiments the housing may not provide any enclosure of the incoming stretch and paddles mounted thereon.

A sweep drive assembly 88 may be mounted on the sweep assembly and may be configured to move the sweep assembly across the bin floor in a forward direction toward an accumulation or pile of particulate material. The sweep drive assembly may be located rearwardly of the sweep assembly and may be located toward the outboard end of the elongated sweep apparatus. In embodiments employing multiple segments in the sweep assembly, an individual sweep drive assembly may be provided for each segment and may be located at the distal end of the respective segment. The sweep drive assembly may be driven by movement of the particulate sweep structure, although in some embodiments the sweep drive assembly utilizes a dedicated drive motor 90 which drives the drive wheel 92 through a drive gear box 94. Those skilled in the art will recognize that other means for moving the sweep apparatus in a forward direction may also be utilized.

In some embodiments of the system 10, such as shown in FIGS. 10 through 13, a sweep assembly 20 of the apparatus 12 may include a paddle support assembly 100 for supporting the plurality of interconnected paddles 26 along a portion of the movement path of the paddles. The paddle support assembly 100 may support paddles on the outgoing stretch 33 of the endless loop member 30, which is not moving particulate material, although optionally the support assembly 100 may be positioned adjacent to and engage paddles on the incoming stretch 32 of the endless loop member that are moving particulate material.

The paddle support assembly 100 may comprise at least one guide member 102 which extends in a direction that is generally parallel to the outgoing stretch 33 of the endless loop member 30, and the member 102 may be positioned adjacent to the outgoing stretch. The at least one guide member 102 may be positioned such that the paddles on the outgoing stretch engage or rest upon the guide member, and illustratively, the guide member may be positioned such that the back edge portion 42 of the perimeter edge 36 of the paddle rests upon the guide member as the paddle moves along a portion of the path corresponding to the outgoing stretch of the loop member 30. In the illustrative embodiments, the guide member 102 may be elongated with an upper face 104 and at least one side edge 105 extending from the upper face.

In some embodiments, the paddle support assembly 100 includes a pair of guide members 102, 103 which may be laterally spaced with respect to the outgoing stretch 33 of the loop member, and the stretch 33 may be positioned between the pair of guide members. The guide members may be positioned substantially parallel to the outgoing stretch 33 and may be oriented substantially parallel to each other. Paddles 26 engaging or resting upon the guide members 102, 103 may bridge between the guide members such that the guide members support the panels. The pair of guide members 102, 103 may be oriented in a guide plane which may be oriented substantially perpendicular to the movement plane 28 of the path. The outgoing stretch 33 of the loop member may be oriented substantially in the guide plane as well.

The one or more guide members may be mounted on a plurality of support walls 108, and the guide members may rest upon the upper edges 108 of the support walls, and the support walls may be oriented substantially perpendicular to the guide plane. A base wall 110 may extend longitudinally with respect to the sweep assembly and also substantially parallel to the guide plane. The base wall 110 may be spaced from the guide members and the support walls may be positioned between the base wall and at least one of the guide members. Lateral walls 112, 114 may extend longitudinally with respect to the sweep assembly and extend from the base wall toward the guide plane. The lateral walls 112, 114 may be oriented substantially perpendicular to the base wall 110 and may be oriented substantially perpendicular to the support walls 108. The support walls may extend between the lateral walls and may be joined to the lateral walls to form one or more compartments below the guide member or members in the guide plane. In some embodiments, the base wall 110 may include at least one drain hole formed therein for facilitating movement of any accumulated material or debris from the compartments so formed.

In some embodiments, the guide member or members are formed of a low friction material to thereby reduce and minimize any friction between the paddles and the guide member on which they rest. Illustratively, the low friction material may comprise an ultra-high molecular weight (UHMW) material, although other materials exhibiting relatively low friction may be employed.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A bin sweep system for moving particulate material in a bin having a bin floor, the system comprising:
    an elongated sweep apparatus having a front and a rear, the sweep apparatus including a particulate sweep structure configured to move particulate material on the bin floor beneath the sweep apparatus toward one end of the elongated sweep apparatus, the particulate sweep structure including a plurality of interconnected paddles movable in a succession on a path along at least a portion of a length of the sweep apparatus and an endless loop member on which the paddles of the plurality of paddles are mounted at spaced locations for moving the paddles along the path;
    wherein the path of the paddles on the endless loop generally lies in a movement plane, an orientation of the movement plane being tilted such that the movement plane is not in a vertical orientation and not in a horizontal orientation;
    wherein each of the paddles has an upright orientation in which the paddle is located adjacent to the bin floor when the sweep apparatus rests upon the bin floor, and in which the paddle is located toward the front of the sweep apparatus to engage particular material on the bin floor in front of the sweep apparatus;
    wherein each of the interconnected paddles has a perimeter edge, the perimeter edge of a said paddle in the upright orientation including:
        a front edge portion positioned at the front of the sweep apparatus and being configured to be oriented substantially perpendicular to the bin floor; and
        a bottom edge portion configured to be positioned adjacent to the bin floor in a substantially parallel orientation to the bin floor.

2. The system of claim 1 wherein the bottom edge portion of the perimeter edge of the paddle extends rearwardly from the front edge portion in a substantially perpendicular relationship to the front edge portion.

3. The system of claim 1 wherein the movement plane is oriented at an angle with respect to a vertical plane from approximately 30 degrees to approximately 60 degrees.

4. The system of claim 3 wherein the movement plane being oriented at an angle of approximately 45 degrees with respect to a vertical plane.

5. The system of claim 1 wherein the endless loop member lifts paddles on an incoming stretch of the endless loop member away from the bin floor to move along an outgoing stretch of the loop member.

6. The system of claim 5 wherein the sweep apparatus includes a sweep assembly with a housing extending between opposite ends of the sweep assembly, the housing defining an interior and at least a portion of the particulate sweep structure being positioned in the interior, the interior having an upper space and a lower space generally below the housing, the incoming stretch of the endless loop member being generally located in the lower space and the outgoing stretch of the endless loop member being generally located in the upper space of the housing.

7. The system of claim 1 wherein the paddles mounted on the endless loop member move upwardly and rearwardly when moving from an incoming stretch of the endless loop member to an outgoing stretch of the loop member.

8. The system of claim 7 wherein the paddles mounted on the endless loop member move downwardly and forwardly when moving from the outgoing stretch to the incoming stretch.

9. The system of claim 1 wherein the perimeter edge of a said paddle has a substantially chevron shape.

10. The system of claim 1 wherein the perimeter edge of a said paddle in the upright orientation further includes:
    a back edge portion positioned toward a rear of the sweep apparatus; and
    a pair of side edge portions positioned between the rear edge portion and one of the bottom and front edge portions.

11. The system of claim 10 wherein each of the side edge portions is oriented at a tilt that is substantially perpendicular to the back edge portion.

12. The system of claim 1 wherein the sweep apparatus includes a sweep assembly movable over the bin floor, the sweep assembly including at least two sweep segments, the at least two sweep segments being positionable in a substantially linear array between inboard and outboard ends of the sweep apparatus and being movable substantially independent of each other about a center post in the bin.

13. The system of claim 1 wherein the sweep apparatus includes a sweep assembly having a wiper structure configured to resist particles from passing underneath the sweep assembly to the rear of the sweep assembly.

14. The system of claim 13 wherein the wiper structure is positioned rearward of paddles mounted on an incoming stretch of the endless loop member and the wiper structure being positioned forward and below the paddles mounted on an outgoing stretch of the endless loop member.

15. The system of claim 1 wherein the sweep apparatus includes a sweep assembly having a paddle support assembly for supporting the plurality of interconnected paddles along a portion of the path.

16. The system of claim 15 wherein the paddle support assembly supports paddles on an outgoing stretch of the endless loop member.

17. A bin sweep system for moving particulate material in a bin having a bin floor, the system comprising:
    an elongated sweep apparatus having a front and a rear, the sweep apparatus including a particulate sweep structure configured to move particulate material on the bin floor beneath the sweep apparatus toward one end of the elongated sweep apparatus, the particulate sweep structure including a plurality of interconnected paddles movable in a succession on a path along at least a portion of a length of the sweep apparatus and an endless loop member on which the paddles of the plurality of paddles are mounted at spaced locations for moving the paddles along the path;

wherein the path of the paddles on the endless loop generally lies in a movement plane, an orientation of the movement plane being tilted such that the movement plane is oriented at an angle with respect to a vertical plane from approximately 30 degrees to approximately 60 degrees;

wherein the endless loop member lifts paddles on an incoming stretch of the endless loop member away from the bin floor to move along an outgoing stretch of the loop member;

wherein each of the paddles has an upright orientation in which the paddle is located adjacent to the bin floor when the sweep apparatus rests upon the bin floor, and in which the paddle is located toward the front of the sweep apparatus to engage particular material on the bin floor in front of the sweep apparatus;

wherein each of the interconnected paddles has a perimeter edge, the perimeter edge of a said paddle in the upright orientation including:
  a front edge portion positioned at the front of the sweep apparatus and being configured to be oriented substantially perpendicular to the bin floor;
  a bottom edge portion configured to be positioned adjacent to the bin floor in a substantially parallel orientation to the bin floor;
and
  wherein the bottom edge portion of the perimeter edge of the paddle extends rearwardly from the front edge portion in a substantially perpendicular relationship to the front edge portion.

18. The system of claim 17 wherein the movement plane being oriented at an angle of approximately 45 degrees with respect to a vertical plane.

19. The system of claim 17 wherein the paddles mounted on the endless loop member move upwardly and rearwardly when moving from the incoming stretch of the endless loop member to the outgoing stretch of the loop member; and
  wherein the paddles mounted on the endless loop member move downwardly and forwardly when moving from the outgoing stretch to the incoming stretch.

20. The system of claim 17 wherein the sweep apparatus includes a sweep assembly with a housing extending between opposite ends of the sweep assembly, the housing defining an interior and at least a portion of the particulate sweep structure being positioned in the interior, the interior having an upper space and a lower space generally below the housing, the incoming stretch of the endless loop member being generally located in the lower space and the outgoing stretch of the endless loop member being generally located in the upper space of the housing,
  wherein the sweep assembly has a wiper structure configured to resist particles from passing underneath the sweep assembly to the rear of the sweep assembly; and
  wherein the wiper structure is positioned rearward of paddles mounted on the incoming stretch of the endless loop member and the wiper structure being positioned forward and below the paddles mounted on the outgoing stretch of the endless loop member.

* * * * *